US012794787B2

(12) United States Patent
Lee et al.

(10) Patent No.: US 12,794,787 B2
(45) Date of Patent: Nov. 10, 2026

(54) METHOD FOR LABELING NETWORK TRAFFIC DATA AND APPARATUS FOR THE SAME

(71) Applicant: ELECTRONICS AND TELECOMMUNICATIONS RESEARCH INSTITUTE, Daejeon (KR)

(72) Inventors: Joo Young Lee, Daejeon (KR); Seung Hyun Yoon, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 117 days.

(21) Appl. No.: 18/925,662

(22) Filed: Oct. 24, 2024

(65) Prior Publication Data

US 2025/0175394 A1 May 29, 2025

(30) Foreign Application Priority Data

Nov. 24, 2023 (KR) ........................ 10-2023-0165480

(51) Int. Cl.
*H04L 41/16* (2022.01)
*G06N 20/00* (2019.01)
*H04L 43/04* (2022.01)

(52) U.S. Cl.
CPC ............ *H04L 41/16* (2013.01); *G06N 20/00* (2019.01); *H04L 43/04* (2013.01)

(58) Field of Classification Search
CPC .......... H04L 41/16; H04L 43/04; G06N 20/00
See application file for complete search history.

(56) References Cited

U.S. PATENT DOCUMENTS

2021/0204152 A1* 7/2021 Vasudevan .......... G06N 3/0475
2022/0036202 A1* 2/2022 Sivashanmugam .... G06N 3/098
2025/0007791 A1* 1/2025 Monjas Llorente .... H04L 41/16

FOREIGN PATENT DOCUMENTS

KR 10-2016-0095856 A 8/2016
KR 10-2022-0126933 A 9/2022
KR 10-2023-0047531 A 4/2023
WO 2021/159749 A1 8/2021
WO 2022/022233 A1 2/2022

* cited by examiner

*Primary Examiner* — Clayton R Williams

(57) ABSTRACT

The present invention relates to a method for labeling network traffic data, and an apparatus for the same. An apparatus for labeling network traffic data according to an aspect of the present disclosure may include: a preprocessing unit for performing preprocessing on network traffic data; a network traffic determination unit for determining whether the network traffic data is a known type of network traffic; a label generation unit for classifying the network traffic data and determining a label for the network traffic data; a data and model storage unit for storing the network traffic data and requesting relearning for an artificial intelligence model based on a preconfigured condition; and an artificial intelligence model learning unit for performing relearning for the artificial intelligence model and updating an existing artificial intelligence model with the relearned artificial intelligence model.

15 Claims, 6 Drawing Sheets

METHOD FOR LABELING NETWORK TRAFFIC DATA AND APPARATUS FOR THE SAME

CROSS-REFERENCE TO RELATED APPLICATIONS

This application claims the benefit of earlier filing date and right of priority to Korean Patent Application No. 10-2023-0165480, filed on Nov. 24, 2023, the contents of which are all hereby incorporated by reference herein in their entirety.

TECHNICAL FIELD

The present disclosure relates to a method for labeling network traffic data, and an apparatus for the same.

BACKGROUND

In order to promote automation and efficiency in next-generation network infrastructure management, an application of artificial intelligence technology is essential. The development of an artificial intelligence learning model for this purpose requires well-constructed learning data. In particular, tagging learning labels that are the target of learning is an important but difficult task.

In order to generate labels for such network traffic, manual work by humans has been relied on in the past. However, unlike the fields of image and language, network traffic data is difficult to interpret intuitively, so it requires work by experts, which limits the ability to secure a large number of high-quality datasets.

To solve this problem, a semi-automated labeling method using artificial intelligence technology has been proposed. However, this method may also cause a generalization capability degradation phenomenon in which the performance of the artificial intelligence model gradually decreases due to slight changes in the data characteristics of network traffic that shows volatility due to the characteristics of time flow and space. Therefore, a continuous retraining process is necessary to maintain the accuracy of the artificial intelligence learning model used for labeling.

SUMMARY

A technical object of the present disclosure is to provide an apparatus and a method for generating a label when generating a learning data set using network traffic.

A technical object of the present disclosure is to provide an apparatus and a method for labeling network traffic with enhanced adaptive capabilities by determining whether network traffic data is identifiable, generating a label for network traffic data that is identifiable, and updating a learning model for network traffic data that is not identifiable so that it can be identifiable in the future.

The technical objects to be achieved by the present disclosure are not limited to the above-described technical objects, and other technical objects which are not described herein will be clearly understood by those skilled in the pertinent art from the following description.

An apparatus for labeling network traffic data according to an aspect of the present disclosure may include: a preprocessing unit for performing preprocessing on network traffic data; a network traffic determination unit for determining whether the network traffic data is a known type of network traffic; a label generation unit for classifying the network traffic data and determining a label for the network traffic data, when the network traffic data is the known type of network traffic; a data and model storage unit for storing the network traffic data and requesting relearning for an artificial intelligence model based on a preconfigured condition, when the network traffic data is not the known type of network traffic; and an artificial intelligence model learning unit for performing relearning for the artificial intelligence model and updating an existing artificial intelligence model with the relearned artificial intelligence model.

A method for labeling network traffic data according to an additional aspect of the present disclosure may include: performing preprocessing on network traffic data; determining whether the network traffic data is a known type of network traffic; classifying the network traffic data and determining a label for the network traffic data, when the network traffic data is the known type of network traffic; storing the network traffic data and performing relearning for an artificial intelligence model based on a preconfigured condition, when the network traffic data is not the known type of network traffic; and updating an existing artificial intelligence model with the relearned artificial intelligence model.

At least one non-transitory computer-readable medium storing at least one instruction according to an additional aspect of the present disclosure, wherein the at least one instruction executable by at least one processor may control an apparatus to: perform preprocessing on network traffic data; determine whether the network traffic data is a known type of network traffic; classify the network traffic data and determine a label for the network traffic data, when the network traffic data is the known type of network traffic; store the network traffic data and perform relearning for an artificial intelligence model based on a preconfigured condition, when the network traffic data is not the known type of network traffic; and update an existing artificial intelligence model with the relearned artificial intelligence model.

Preferably, the network traffic data may be reassembled into predetermined units through the preprocessing and then converted into an input sequence.

Preferably, whether the network traffic data is the known type of network traffic may be determined based on whether the converted input sequence is similar to an input sequence pattern used as learning data when training an artificial intelligence model for traffic classification.

Preferably, the artificial intelligence model may include i) a traffic determination model for determining the network traffic data, ii) a traffic classification model for classifying the network traffic data, and iii) a pretraining model corresponding to a basic model for the traffic determination model and the traffic classification model, the preconfigured condition may include a first relearning condition for the traffic determination model, a second relearning condition for the traffic classification model, and a third relearning condition for the pretraining model, and relearning of the traffic determination model, the traffic classification model, and the pretraining model may be performed individually when the first relearning condition, the second relearning condition, and the third relearning condition are satisfied.

Preferably, the preconfigured condition may include at least one of feedback on a result by the artificial intelligence model, a learning model usage period, and a relearning request event by an external system including a user.

Preferably, the existing artificial intelligence model may be updated with the relearned artificial intelligence model when necessary or when a subscription condition is satisfied.

Preferably, the subscription condition may include at least one of a subscription period and a subscription cycle.

According to an embodiment of the present invention, it is possible to solve the problem of the generalization ability of a model by providing a method for continuously updating an artificial intelligence model used for traffic identification and labeling in a network traffic labeling apparatus.

In addition, according embodiment of the present invention, users can obtain labels for learning about network traffic that is difficult to understand intuitively.

In addition, to an embodiment of the present invention, flexibility and scalability for network traffic labeling can be provided by adding a plug-in learning model that infers the corresponding label according to the target label required by the user.

Effects achievable by the present disclosure are not limited to the above-described effects, and other effects which are not described herein may be clearly understood by those skilled in the pertinent art from the following description.

BRIEF DESCRIPTION OF THE DRAWINGS

Accompanying drawings included as part of detailed description for understanding the present disclosure provide embodiments of the present disclosure and describe technical features of the present disclosure with detailed description.

DETAILED DESCRIPTION

Figure 1:
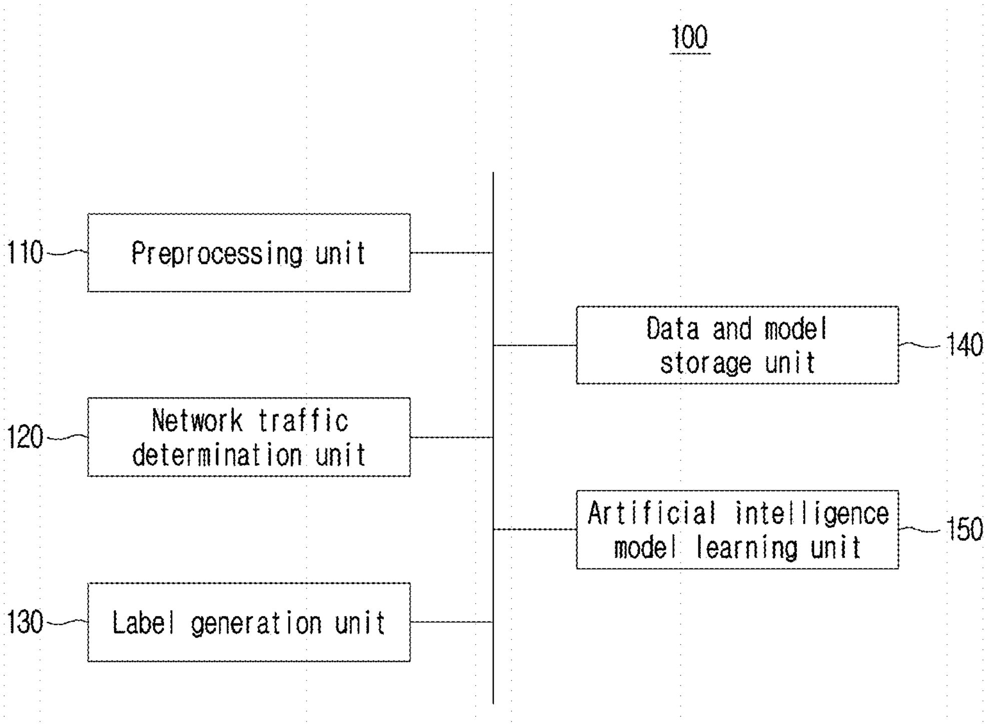
FIG. 1 is a diagram illustrating a network traffic labeling apparatus according to one embodiment of the present invention.

Since the present disclosure can make various changes and have various embodiments, specific embodiments will be illustrated in the drawings and described in detail in the detailed description. However, this is not intended to limit the present disclosure to specific embodiments, and should be understood to include all changes, equivalents, and substitutes included in the feature and technical scope of the present disclosure. Similar reference numbers in the drawings refer to identical or similar functions across various aspects. The shapes and sizes of elements in the drawings may be exaggerated for clearer explanation. For a detailed description of the exemplary embodiments described below, refer to the accompanying drawings, which illustrate specific embodiments by way of example. These embodiments are described in sufficient detail to enable those skilled in the art to practice the embodiments. It should be understood that the various embodiments are different from one another but are not necessarily mutually exclusive. For example, specific shapes, structures and characteristics described herein with respect to one embodiment may be implemented in other embodiments without departing from the spirit and scope of the disclosure. Additionally, it should be understood that the position or arrangement of individual components within each disclosed embodiment may be changed without departing from the spirit and scope of the embodiment. Accordingly, the detailed description that follows is not to be intended in a limiting sense, and the scope of the exemplary embodiments is limited only by the appended claims, together with all equivalents to what those claims assert if properly described.

In the present disclosure, terms such as first, second, etc. may be used to describe various components, but the components should not be limited by the terms. The above terms are used only for the purpose of distinguishing one component from another. For example, a first component may be referred to as a second component, and similarly, the second component may be referred to as a first component without departing from the scope of the present disclosure. The term "and/or" includes any of a plurality of related stated items or a combination of a plurality of related stated items.

When a component of the present disclosure is referred to as being "connected" "accessed" to another component, it may be directly connected or connected to the other component, but other components may exist in between. It must be understood that it may be possible. On the other hand, when it is mentioned that a component is "directly connected" or "directly accessed" to another component, it should be understood that there are no other components in between.

The components appearing in the embodiments of the present disclosure are shown independently to represent different characteristic functions, and do not mean that each component is comprised of separate hardware or one software component. That is, each component is listed and included as a separate component for convenience of explanation, and at least two of each component can be combined to form one component, or one component can be divided into a plurality of components to perform a function, and each of these components can be divided into a plurality of components. Integrated embodiments and separate embodiments of the constituent parts are also included in the scope of the present disclosure as long as they do not deviate from the essence of the present disclosure.

The terms used in this disclosure are only used to describe specific embodiments and are not intended to limit the disclosure. Singular expressions include plural expressions unless the context clearly dictates otherwise. In the present disclosure, terms such as "comprise" or "have" are intended to designate the presence of features, numbers, steps, operations, components, parts, or combinations thereof described in the specification, but are not intended to indicate the presence of one or more other features. It should be understood that this does not exclude in advance the possibility of the existence or addition of elements, numbers, steps, operations, components, parts, or combinations thereof. In other words, the description of "including" a specific configuration in this disclosure does not exclude configurations other than the configuration, and means that additional configurations may be included in the scope of the implementation of the disclosure or the technical feature of the disclosure.

Some of the components of the present disclosure may not be essential components that perform essential functions in the present disclosure, but may simply be optional components to improve performance. The present disclosure can be implemented by including only essential components for implementing the essence of the present disclosure, excluding components used only to improve performance, and a structure that includes only essential components excluding optional components used only to improve performance. is also included in the scope of rights of this disclosure.

Hereinafter, embodiments of the present disclosure will be described in detail with reference to the drawings. In describing the embodiments of the present specification, if it is determined that a detailed description of a related known configuration or function may obscure the gist of the present specification, the detailed description will be omitted, and the same reference numerals will be used for the same components in the drawings. Redundant descriptions of the same components are omitted.

Hereinafter, in the description of the present invention, network traffic data refers to data exchanged between each node within a network, and may be simply referred to as network traffic or network data.

FIG. 1 is a diagram illustrating a network traffic labeling apparatus according to one embodiment of the present invention.

In FIG. 1, for the convenience of explanation, components are illustrated separately for each function of the network traffic labeling apparatus (100), however components for each function may not necessarily be implemented separately. In other words, multiple functions may be implemented to be performed by one component, and one component illustrated in FIG. 1 may be implemented to be divided into sub-components.

Referring to FIG. 1, a network traffic labeling apparatus (100) may be configured to include a preprocessing unit (110), a network traffic determination unit (120), a label generation unit (130), a data and model storage unit (140), and an artificial intelligence model learning unit (150).

The preprocessing unit (110) can perform preprocessing on network traffic data collected from external devices, etc. For example, the preprocessing unit (110) can reassemble network traffic data into predetermined units (e.g., packets, flows, frames, etc.) according to the context, select only data to be used in other components (i.e., other functional units) within the apparatus for traffic determination and classification, etc. from among the reassembled network traffic data, and convert the selected data into an input sequence.

The data to be used for the above traffic determination and classification may correspond to data deemed necessary for training the artificial intelligence model. For example, it may be all, part, recombination, or metadata of recombined network traffic data such as Internet Protocol (IP) header information, Transmission Control Protocol (TCP), User Datagram Protocol (UDP) header information, and a payload, etc. The input sequence may be a list of vocabularies encoded using a corpus. The corpus may be a set of vocabularies (table: token, index) generated by encoding tokens that are divided into a certain size of network traffic data for processing network traffic or encrypted network traffic data by an algorithm. The recombined network traffic data (or selected data) may be converted into one or more input sequences according to a predetermined sequence length or configuration.

The network traffic determination unit (120) can determine whether the input sequence is a known type of network traffic data. The network traffic determination unit (120) may correspond to an artificial intelligence model that has learned a pattern of training data. More specifically, the artificial intelligence model may be a binary classification model that has an inference function that determines an input sequence pattern similar to the sequence pattern of the network traffic data used as the learning data during training as a known (known or seen) type of network traffic data, and on the other hand, determines an input sequence pattern that is not similar as an unknown (unknown or unseen) type of network traffic data. Here, for example, similar may mean that it includes the same sequence pattern and also has a similarity value that is higher than (or exceeds) a predefined or configured threshold.

In addition, the network traffic determination unit (120) can request a retraining model from the data and model storage unit (140) for updating the artificial intelligence model in use. Here, the network traffic determination unit (120) can transmit requirements for a retraining model together with a request for the retraining model. The requirements for the retraining model can include an identifier, a version, a generation time, an algorithm, a performance, a reputation, etc. of the artificial intelligence model for which retraining is required. In addition, the network traffic determination unit (120) can subscribe to the retraining model in the data and model storage unit (140) for updating the artificial intelligence model in use. Here, the network traffic determination unit (120) can transmit requirement(s) and subscription condition(s) for the retraining model together for subscribing to the retraining model. For example, requirement(s) for a relearned model may include an identifier, a version, a generation time, an algorithm, a performance, a reputation, etc. of the model. For example, subscription condition(s) for a relearned model may include a subscription period, a subscription cycle, etc. That is, if the subscription condition for the received relearning model is satisfied, the data and model storage unit (140) can transfer the relearning model to the network traffic determination unit (120) even without a separate request from the network traffic determination unit (120). The artificial intelligence model requesting relearning from the network traffic determination unit (120) may be a binary classification model having an inference function that determines whether it knows or does not know about the input sequence.

Additionally, the network traffic determination unit (120) can receive a re-learned model from the data and model storage unit (140) and update the artificial intelligence model in use.

The label generation unit (130) can classify the network traffic data to determine a label for the input sequence when the input sequence is determined as known network traffic data by the network traffic determination unit (120). The label generation unit (130) may correspond to at least one artificial intelligence model that infers the label of the input sequence. For example, the label generation unit (130) may be an artificial intelligence model that has learned multi-class classification using training data. More specifically, for the pre-training model, it may be a multi-class classification model that is fine-tuned to classify network traffic data using an additional training data set. When the type of label targeted for artificial intelligence learning for the input sequence is changed or added, and various labels must be generated, the label generation unit (130) may additionally include an artificial intelligence model that infers the corresponding label.

The label generation unit (130) may request a learning model or a relearning model from the data and model storage unit (140) to secure a new artificial intelligence model or update an artificial intelligence model in use. Here, the label generation unit (130) can transmit requirement(s) for the learning model or relearning model together with the request for the learning model or relearning model. The requirements for the learning model or relearning model can include an identifier, a version, a generation time, an algorithm, an inference function, a performance, a reputation, etc. of the model for the learning model or relearning model. In addition, the label generation unit (130) can subscribe to the learning model or relearning model in the data and model storage unit (140) to secure a new artificial intelligence model or update the artificial intelligence model in use. Here, the label generation unit (130) can transmit requirement(s) and subscription condition(s) for the learning model or relearning model together for subscribing to the learning model or relearning model. For example, requirement(s) for a learning model or a relearning model may include a model identifier, a version, a generation time, an algorithm, an inference function, a performance, a reputation, etc. For example, subscription condition(s) for a learning model or a relearning model may include a subscription period, a subscription cycle, etc. That is, if the subscription condition(s) for the received learning model or relearning model are satisfied, the data and model storage unit (140) can transfer the learning model or relearning model to the label generation unit (130) even without a separate request from the label generation unit (130). The artificial intelligence model requested by the label generation unit (130) may be a multi-class classification model that classifies the type of the input sequence. In addition, if additional label generation is required, it may be an artificial intelligence model that provides a function to infer the corresponding label using the input sequence.

In addition, the label generation unit (130) can receive a learning model or a relearned model from the data and model storage unit (140) and update a newly installed or used artificial intelligence model.

The data and model storage unit (140) can store an input sequence determined as unknown network traffic data by the network traffic determination unit (120). In addition, the data and model storage unit (140) may include functions for data management such as inquiry, search, and deletion of stored network traffic data. In addition, it may include functions for artificial intelligence model management such as storage, inquiry, search, and deletion of metadata such as an artificial intelligence learning model and an artificial intelligence learning model identifier, a version, and a generation time, etc.

In addition, the data and model storage unit (140) can review the relearning condition(s) and, if the condition(s) are satisfied, request relearning to the artificial intelligence model learning unit (150). The above re-learning condition (s) may include feedback (e.g., feedback from a verification system or an external system, feedback from an internal system) on the result of traffic determination inference generated by the learning model, feedback on the accuracy of the labels generated by the learning model, the period of use of the learning model, and re-learning request event(s) by external systems including users, etc. When the data and model storage unit (140) requests re-learning to the artificial intelligence model learning unit (150), the data and model storage unit (140) may transmit re-learning parameters such as a location of the training data set to be used for re-learning, a storage location of the re-learned model, and a setting value, etc.

In addition, when the data and model storage unit (140) receives a relearning model generated from the artificial intelligence model learning unit (150), it can store the relearning model and metadata such as a relearning model identifier, a version, and a generation time, etc. together.

According to another embodiment, the data and model storage unit (140) may review a first relearning condition, and if the first relearning condition is satisfied, may request relearning to the determination model learning unit (151) in the artificial intelligence model learning unit (150). The first re-learning condition may correspond to feedback on a result of traffic determination inference generated by the learning model, a period of use of the learning model, a re-learning request event by an external system including a user, etc. When the data and model storage unit (140) requests relearning from the determination model learning unit (151), the data and model storage unit (140) can transmit relearning parameters such as a location of the training data set to be used for re-learning, a storage location of the relearned model, a parameter setting value, etc. When the data and model storage unit (140) receives the re-learning model generated from the determination model learning unit (151), it can store the re-learning model and metadata such as a re-learning model identifier, version, and generation time, etc. together.

According to another embodiment, the data and model storage unit (140) may review a second relearning condition, and if the second relearning condition is satisfied, may request relearning to the classification model learning unit (152) in the artificial intelligence model learning unit (150). The second relearning condition may include feedback on an accuracy of a label generated by the learning model, a period of use of the learning model, a relearning request event by an external system including a user, etc. When the data and model storage unit (140) requests re-learning from the classification model learning unit (152), the data and model storage unit (140) can transmit re-learning parameters such as a location of the training data set to be used for relearning, a storage location of the re-learned model, and a setting value, etc. When the data and model storage unit (140) receives the re-learning model generated from the classification model learning unit (152), it can store the re-learning model and metadata such as a re-learning model identifier, a version, and a generation time, etc. together.

According to another embodiment, the data and model storage unit (140) may review a third relearning condition, and if the third relearning condition is satisfied, may request relearning to the pre-training model learning unit (153) in the artificial intelligence model learning unit (150). The third relearning condition may correspond to feedback on a result of traffic determination inference generated by the learning model, feedback on an accuracy of a label generated by the learning model, a period of use of the learning model, a relearning request event by an external system including a user, etc. When the data and model storage unit (140) requests re-learning from the pre-training model learning unit (153), re-learning parameters such as a location of the training data set to be used for re-learning, a storage location of the re-learned model, and a setting value can be transmitted together. When the data and model storage unit (140) receives the re-learning model generated from the pretraining model learning unit (153), it can store the relearning model and metadata such as a re-learning model identifier, a version, and a generation time, etc. together.

In addition, when the data and model storage unit (140) receives a request for provision of a relearning model and requirement information for the relearning model from the network traffic determination unit (120), it can search for a model that meets the requirement among the stored artificial intelligence models and transmit it. Here, the data and model storage unit (140) can search for an artificial intelligence model using the requirement information for the re-learning model. If there is no artificial intelligence model that meets the requirement, it can request (re) learning for the corresponding artificial intelligence model from the artificial intelligence model learning unit (150) or the determination model learning unit (151) and transmit the returned model.

In addition, when the data and model storage unit (140) receives a request for provision of a relearning model and requirement information for the relearning model from the label generation unit (130), it can search for a model that meets the requirement among the stored artificial intelligence models and transmit it. Here, the data and model storage unit (140) can search for an artificial intelligence model using the requirement information for the relearning model. If there is no artificial intelligence model that meets the requirement, it can request (re) learning for the corresponding artificial intelligence model from the artificial intelligence model learning unit (150) or the classification model learning unit (152) and transmit the returned model.

In addition, when the data and model storage unit (140) receives a request for provision of a re-learning model and requirement information for a re-learning model from the determination model learning unit (151) or the classification model learning unit (152), it can search for a model that meets the requirement among the stored artificial intelligence models and transmit it. Here, the data and model storage unit (140) can search for an artificial intelligence model using the requirement information for the re-learning model. If there is no artificial intelligence model that meets the requirement, it can request (re) learning for the corresponding artificial intelligence model from the artificial intelligence model learning unit (150) or the pre-training model learning unit (153) and transmit the returned model.

In addition, the data and model storage (140) can provide a subscription service for the re-learning model. The data and model storage (140) can receive subscription applications for the (re) learning model from the network traffic determination unit (120), the label generation unit (130), the determination model learning unit (151), the classification model learning unit (152), etc. When applying for a subscription, subscription information such as an identifier, a version, an algorithm, a performance condition, a subscription period, and a subscription cycle of the (re) learning model can be transmitted together. If a subscription cancellation request is received or the subscription period ends, the data and model storage (140) can cancel the corresponding subscription.

In addition, when the data and model storage unit (140) receives a relearned model from the artificial intelligence model learning unit (150) and the determination model learning unit (151) while the network traffic determination unit (120) is subscribing to the relearned model, if the relearned model requirement(s) and subscription information are satisfied, the relearned model can be transmitted to the network traffic determination unit (120) without an additional request from the network traffic determination unit (120).

When the data and model storage unit (140) receives a (re)learning model from the artificial intelligence model learning unit (150) and the classification model learning unit (152) while the label generation unit (130) is subscribing to the (re) learning model, if the re-learning model requirement (s) and subscription information are satisfied, the re-learned model can be transmitted to the label generation unit (130) without an additional request from the label generation unit (130).

When the data and model storage unit (140) receives a relearned model from the artificial intelligence model learning unit (150) and/or the pre-training model learning unit (153) while the determination model learning unit (151) and/or the classification model learning unit (152) are subscribing to the relearned model, if the relearned model requirements and subscription information are satisfied, the relearned model can be transmitted to the determination model learning unit (151) and/or the classification model learning unit (152) without an additional request from the determination model learning unit (151) and/or the classification model learning unit (152).

The artificial intelligence model learning unit (150) can receive a learning request for an artificial intelligence model from the data and model storage unit (140) and an external system, learn or relearn the artificial intelligence model, and transfer the learned or learned model to the data and model storage unit (140). This will be described in more detail below with reference to the drawings.

Figure 2:
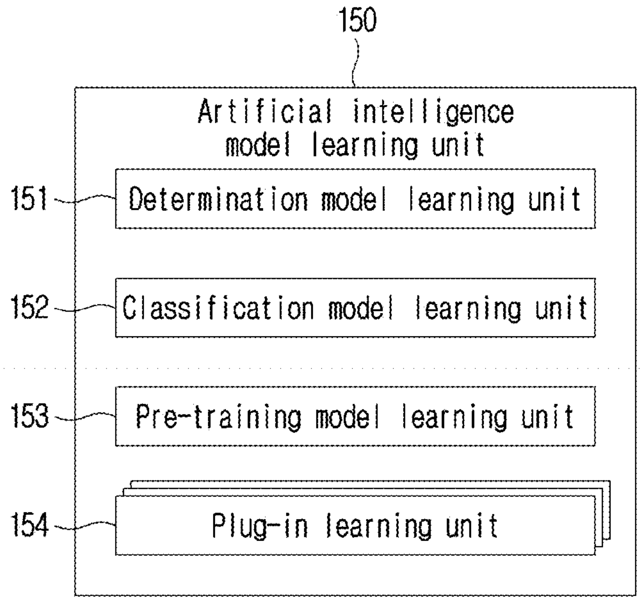
FIG. 2 illustrates an artificial intelligence model learning unit according to one embodiment of the present invention.

FIG. 2 illustrates an artificial intelligence model learning unit according to one embodiment of the present invention.

Referring to FIG. 2, the artificial intelligence model learning unit (150) may be configured to include a determination model learning unit (151), a classification model learning unit (152), and a pre-training model learning unit (153). In addition, one or more plug-in learning units (154) may be added to generate various labels for input sequences. The plug-in learning unit (154) may correspond to a transfer learning model fine-tuned based on a pre-training model when a target label to be additionally generated is determined. Since the artificial intelligence model learning unit (150) may include generalized operations and procedures of the plug-in learning unit (154), separate operations and procedures for the plug-in learning unit are not described in the following specification for convenience of explanation, but as described above, one or more plug-in learning units (154) may be included in the artificial intelligence model learning unit (150).

The determination model learning unit (151) can receive a learning or relearning request for an artificial intelligence model from the data and model storage unit (140) and an external system, learn or relearn a network traffic determination model, and return a learned or relearned model. For example, the determination model learning unit (151) can perform a relearning process to fine-tune the artificial intelligence model performing binary classification of the network traffic determination unit (120) to learn a pattern for an input sequence stored in the data and model storage unit (140). In this case, through relearning, the artificial intelligence model performing the binary classification can learn the previously unknown stored input sequence as known data by encoding the pattern of the stored input sequence. Accordingly, the relearned artificial intelligence model performing the binary classification can identify the input sequence data set used during relearning as known network traffic when performing an inference function for determining network traffic.

The classification model learning unit (152) can receive a learning or relearning request for an artificial intelligence model from the data and model storage unit (140) and an external system, learn or relearn a network traffic classification model, and return a learned or relearned model. For example, the classification model learning unit (151) can perform a re-learning process to fine-tune the AI model performing the multi-class classification of the label generation unit (130) to learn the features of the input sequence stored in the data and model storage unit (140). In this case, the artificial intelligence model that performs the multi-class classification through relearning can classify additional classes by learning the characteristics of the stored input sequence. Accordingly, the artificial intelligence model that performs the multi-class classification that has been relearned can perform classification of input sequences with similar characteristics to the input sequence used during relearning when performing the inference function that classifies network traffic, and determine the class of the input sequence.

The pre-training model learning unit (153) receives a re-learning request for an artificial intelligence model from the data and model storage unit (140) and an external system, learns or re-learns the pre-training model, and returns the learned or re-learned model. Here, the pre-training model may correspond to a basic artificial intelligence model used for fine tuning in the determination model learning unit (151) and the classification model learning unit (152). The pre-training model learning unit (153) can re-learn the learned transformer model to understand the context of network traffic and to grasp its structure and meaning using the input sequence. The pre-trained model generated through retraining can enhance generalization and expressiveness for network traffic data by performing additional modeling for new input sequences. The re-trained pre-trained model can help in determination learning and classification learning for new input sequences when learning the determination model and the classification model through fine tuning. That is, the pre-trained model may mean a prior learning model for network traffic data, and as the pre-trained model is fine-tuned, the pre-trained model may be extended/upgraded to a model 1 for discrimination of network traffic data, or may be extended/upgraded to a model for classification of network traffic data.

Figure 3:
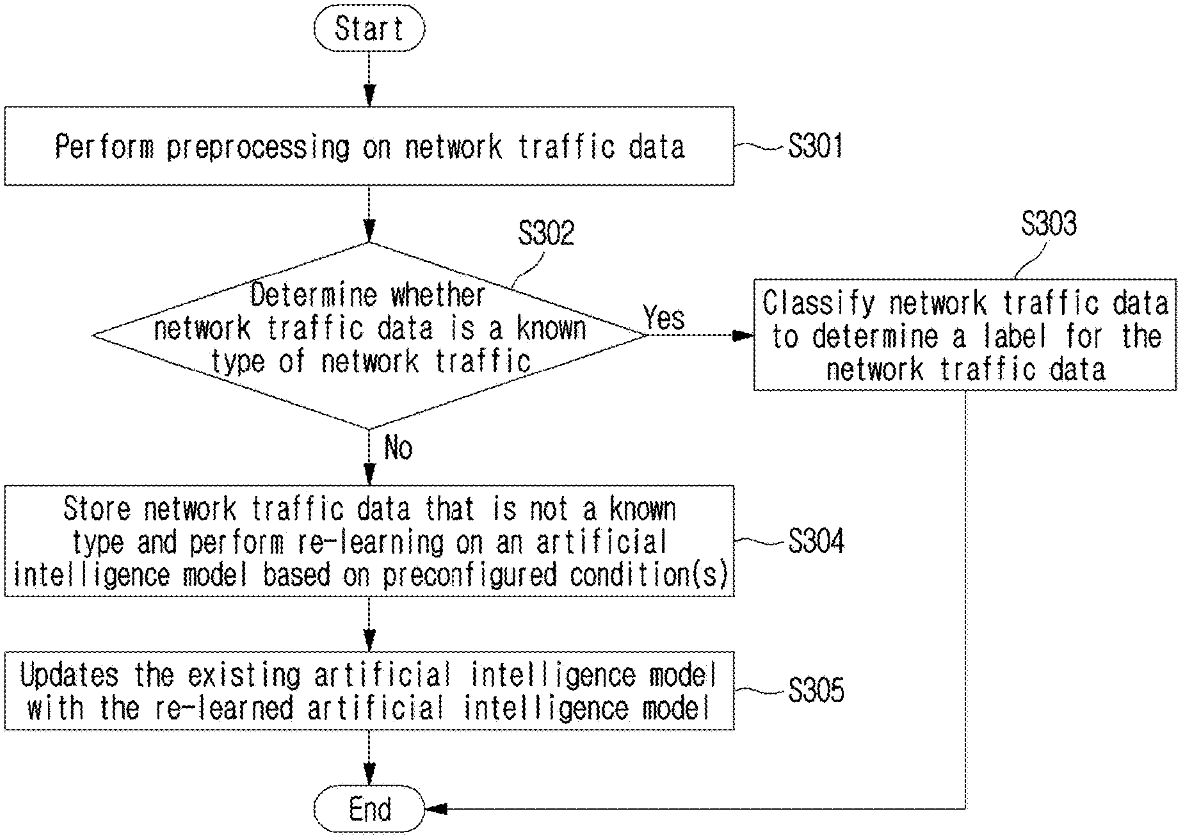
FIG. 3 illustrates a method for labeling network traffic data according to one embodiment of the present invention.

FIG. 3 illustrates a method for labeling network traffic data according to one embodiment of the present invention.

Referring to FIG. 3, the network traffic labeling apparatus (100) performs preprocessing on network traffic data (S301). Here, the network traffic labeling apparatus (100) can reassemble network traffic data into units (e.g., packets, flows, frames, etc.) according to the context.

The network traffic labeling apparatus (100) determines whether the network traffic data is a known type of network traffic (S302). Here, the network traffic labeling apparatus (100) determines whether the recombined network traffic data (or selected data) is converted into one or more input sequences according to a predetermined sequence length or setting, and whether it is similar to the sequence pattern of the network traffic data used as learning data during training, thereby determining whether it is a known type or not.

If the network traffic data is determined to be a known type of network traffic data as determined in step S302, the network traffic labeling apparatus (100) classifies the network traffic data to determine a label for the network traffic data (S303).

On the other hand, if the network traffic data is not a known type of network traffic data as determined in step S302, the network traffic labeling apparatus (100) stores the network traffic data and performs re-learning on the artificial intelligence model based on preconfigured condition(s) (S304). Here, the network traffic labeling apparatus (100) can store an input sequence determined as unknown network traffic data. In addition, the preconfigured condition(s) (i.e., re-learning condition(s)) may include feedback on a result of traffic determination inference generated by the learning model, feedback on an accuracy of a label generated by the learning model (e.g., feedback from a verification system or an external system, feedback from an internal system), a period of use of the learning model, a re-learning request event by external systems including users, etc.

The network traffic labeling apparatus (100) updates the existing artificial intelligence model with the re-learned artificial intelligence model (S305).

Figure 4:
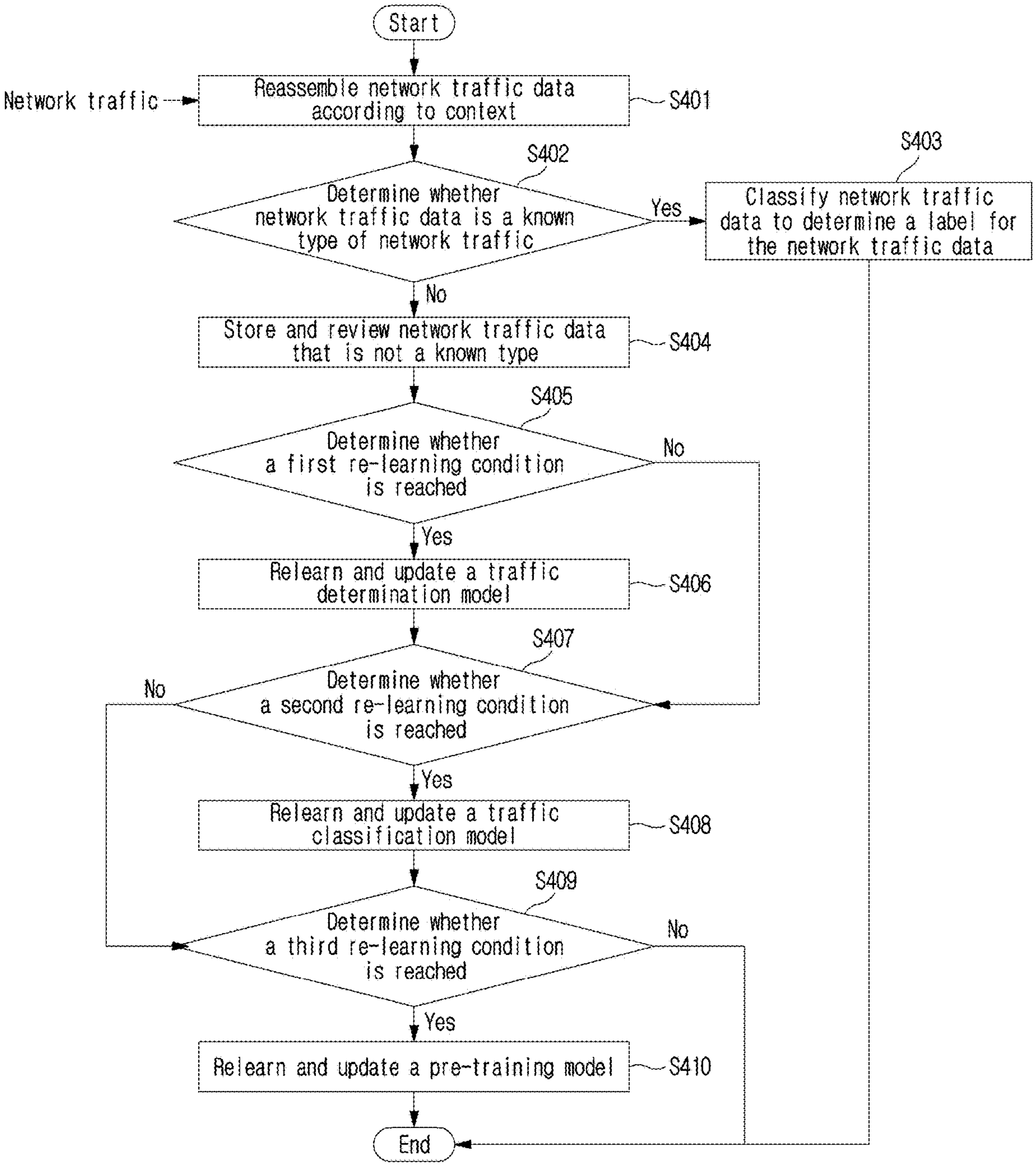
FIG. 4 illustrates a method for labeling network traffic data according to one embodiment of the present invention.

FIG. 4 illustrates a method for labeling network traffic data according to one embodiment of the present invention.

Referring to FIG. 4, when receiving network traffic data (i.e., network traffic) from an external device, etc., the network traffic labeling apparatus (100) reassembles the network traffic data into predetermined units (e.g., packets, flows, frames, etc.) according to the context (S401).

The network traffic labeling apparatus (100) determines whether the network traffic data is a known type of network traffic (S402). Here, the network traffic labeling apparatus (100) converts the recombined network traffic data (or selected data) into one or more input sequences according to a predetermined sequence length or setting, and determines whether it is similar to the sequence pattern of the network traffic data used as learning data during training, thereby determining whether it is a known type or not.

If the network traffic data is determined to be a known type of network traffic data as determined in step S402, the network traffic labeling apparatus (100) classifies the network traffic data to determine a label for the network traffic data (S403).

On the other hand, if the network traffic data is not a known type of network traffic data as determined in step S302, the network traffic labeling device (100) stores the network traffic data and reviews the preconfigured condition (s) (i.e., relearning condition(s)) (S404). Here, the network traffic labeling apparatus (100) can store the input sequence determined as unknown network traffic data.

The network traffic labeling apparatus (100) determines whether a first re-learning condition (e.g., feedback on a result of traffic judgment inference generated by the learning model, a period of use of the learning model, a re-learning request event by an external system including a user, etc.) is reached (satisfied) (S405).

If the first relearning condition is satisfied as a result of the determination at step S405, the network traffic labeling apparatus (100) relearns the traffic determination model and updates the existing traffic determination model with the relearned traffic determination model (S406).

On the other hand, if the first re-learning condition is not satisfied as determined in step S405, the network traffic labeling apparatus (100) determines whether a second re-learning condition (e.g., feedback on an accuracy of a label generated by the learning model, a period of use of the learning model, a re-learning request event by an external system including a user, etc.) is reached (satisfied) (S407).

If the second re-learning condition is satisfied as determined at step S407, the network traffic labeling apparatus (100) re-learns the traffic classification model and updates the existing traffic classification model with the re-learned traffic classification model (S408).

On the other hand, if the second re-learning condition is not satisfied as a result of the determination at step S407, the network traffic labeling apparatus (100) determines whether a third re-learning condition (e.g., feedback on a result of traffic determination inference generated by the learning model, feedback on an accuracy of a label generated by the learning model, a period of use of the learning model, a re-learning request event by an external system including a user, etc.) is reached (satisfied) (S409).

If the third retraining condition is satisfied as determined at step S409, the network traffic labeling apparatus (100)

retrains the pre-training model and updates the existing pre-training model with the relearned pre-training model (S410).

Figure 5:
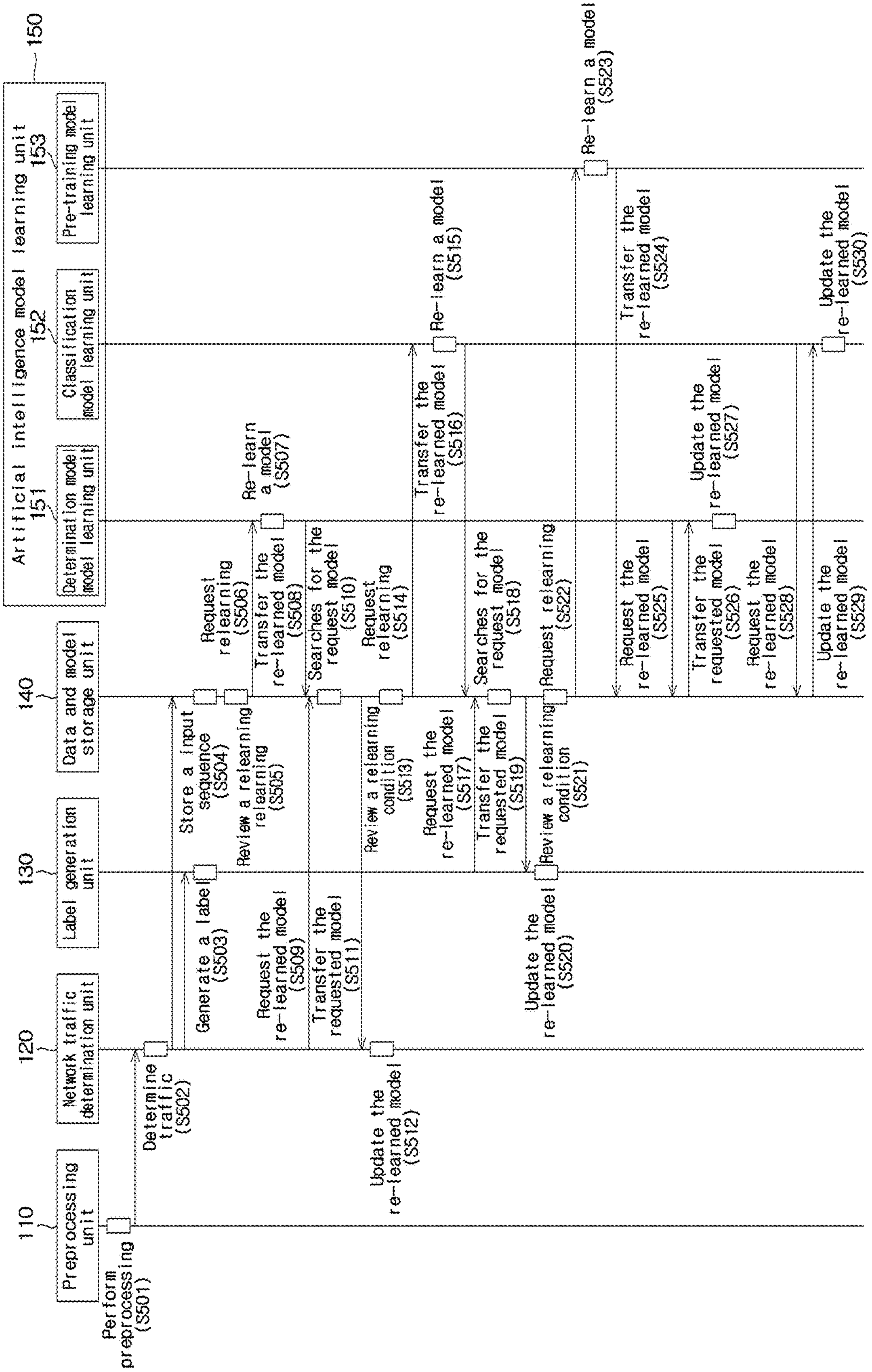
FIG. 5 illustrates a procedure for updating a relearned artificial intelligence model according to one embodiment of the present invention.

FIG. 5 illustrates a procedure for updating a relearned artificial intelligence model according to one embodiment of the present invention.

Referring to FIG. 5, when the preprocessing unit (110) receives network traffic data (i.e., network traffic) from an external device, etc., it performs preprocessing (i.e., recombining of network traffic data) on the network traffic data (S501).

The network traffic determination unit (120) determines whether the network traffic data is a known type of network traffic (S502). Here, the network traffic determination unit (120) converts the recombined network traffic data (or selected data) into one or more input sequences according to a predetermined sequence length or setting, and determines whether it is similar to the sequence pattern of the network traffic data used as learning data during training, thereby determining whether it is a known type or not.

If the network traffic data is determined to be a known type of network traffic data as determined in step S502, the label generation unit (130) classifies the network traffic data and determines a label for the network traffic data (S503).

If the network traffic data is not a known type of network traffic data as determined in step S502, the data and model storage unit (140) stores the input sequence (i.e., the input sequence converted from the recombined network traffic data) (S504) and reviews a first relearning condition (S505).

If the first relearning condition (e.g., feedback on a result of traffic determination inference generated by the learning model, the learning model usage period, a relearning request event by an external system including a user, etc.) is satisfied, the data and model storage unit (140) requests the determination model learning unit (151) to relearn the traffic determination model (S506). Here, the data and model storage unit (140) may transmit relearning parameters such as a location of the training data set to be used for relearning, a storage location of the relearned model, and a setting value, while requesting relearning.

When a re-learning request is received, the determination model learning unit (151) re-learns the traffic determination model (S507) and transfers the re-learned traffic determination model to the data and model storage unit (140) (S508).

The network traffic determination unit (120) can request (i.e., include requirements) a re-learned traffic determination model from the data and model storage unit (140) (S509). Here, requirement(s) for the re-learned model can include a model identifier, a version, a generation time, an algorithm, a performance, a reputation, etc. In this case, the data and model storage unit (140) searches for a model that meets the requirements among the stored artificial intelligence models (S510) and transmits it to the network traffic determination unit (120) (S511).

The network traffic determination unit (120) updates the existing traffic determination model with the received relearned traffic determination model (S512).

In addition, the data and model storage unit (140) reviews a second re-learning condition (e.g., feedback on an accuracy of a label generated by the learning model, a period of use of the learning model, a re-learning request event by an external system including a user, etc.) (S513). If the second re-learning condition is satisfied, the data and model storage unit (140) requests the classification model learning unit (152) to re-learn the traffic classification model (S514). Here, the data and model storage unit (140) may transmit re-learning parameters such as a location of the training data set to be used for re-learning, a storage location of the re-learned model, and a setting value, while requesting re-learning.

When a re-learning request is received, the classification model learning unit (152) re-learns the traffic classification model (S515) and transfers the re-learned traffic classification model to the data and model storage unit (140) (S516).

The label generation unit (130) can request (i.e., include requirements) a re-learned traffic classification model from the data and model storage unit (140) (S517). Here, requirement(s) for the re-learned model can include a model identifier, a version, a generation time, an algorithm, a performance, a reputation, etc. In this case, the data and model storage unit (140) searches for a model that meets the requirements among the stored artificial intelligence models (S518) and transmits it to the label generation unit (130) (S519).

The label generation unit (130) updates the existing traffic classification model with the received re-learned traffic classification model (S520).

In addition, the data and model storage unit (140) reviews a third re-learning condition (e.g., feedback on the result of traffic determination inference generated by the learning model, feedback on an accuracy of a label generated by the learning model, a learning model usage period, a re-learning request event by external systems including users, etc.) (S521). If the third re-learning condition is satisfied, the data and model storage unit (140) requests the pre-training model learning unit (153) to re-learn the traffic classification model (S522). Here, the data and model storage unit (140) may transmit re-learning parameters such as a location of the training data set to be used for re-learning, a storage location of the re-learned model, and a setting value, along with the re-learning request.

When the pre-training model learning unit (153) receives the re-learning request, it re-learns the pre-training model (S523) and transmits the re-learned pre-training model to the data and model storage unit (140) (S524).

The determination model learning unit (151) can request (i.e., include requirements) a relearned pre-training model from the data and model storage unit (140) (S525). Here, requirement(s) for the relearned model can include a model identifier, a version, a generation time, an algorithm, a performance, a reputation, etc. In this case, the data and model storage unit (140) transmits the requested pre-training model to the determination model learning unit (151) (S526). The determination model learning unit (151) updates the existing pre-training model with the received relearned pre-training model (S527).

The classification model learning unit (152) can request (i.e., include requirements) a relearned pre-training model from the data and model storage unit (140) (S528). Here, the requirement(s) for the relearned model can include a model identifier, a version, a generation time, an algorithm, a performance, a reputation, etc. In this case, the data and model storage unit (140) transfers the requested pre-training model to the classification model learning unit (152) (S529). The classification model learning unit (152) updates the existing pre-training model with the received relearned pre-training model (S530).

Figure 6:
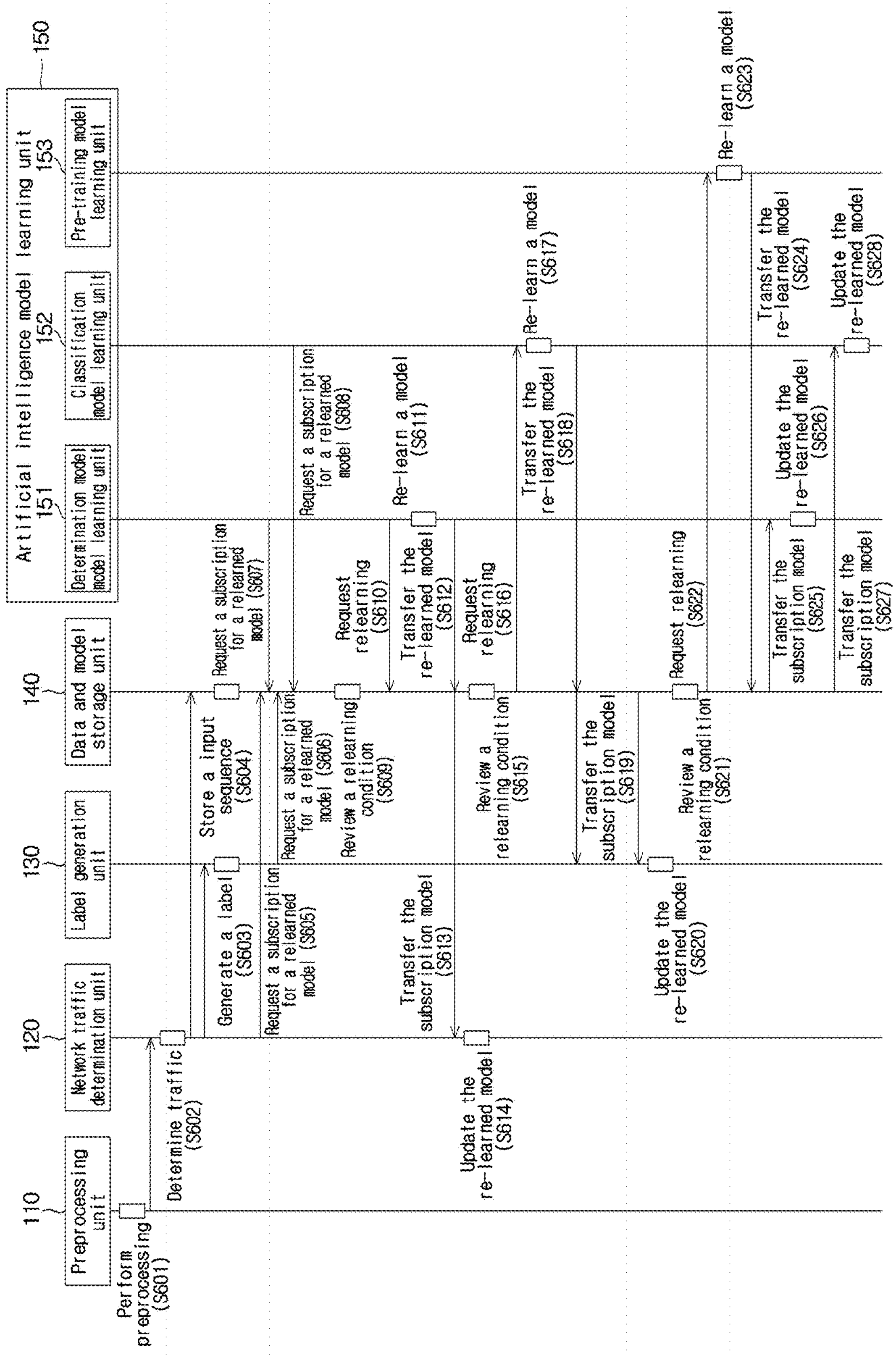
FIG. 6 illustrates a procedure for updating a relearned artificial intelligence model by subscription to an artificial intelligence model according to one embodiment of the present invention.

FIG. 6 illustrates a procedure for updating a relearned artificial intelligence model by subscription to an artificial intelligence model according to one embodiment of the present invention.

Referring to FIG. 6, when the preprocessing unit (110) receives network traffic data (i.e., network traffic) from an external device, etc., it performs preprocessing (i.e., recombining the network traffic data) on the network traffic data (S601).

The network traffic determination unit (120) determines whether the network traffic data is a known type of network traffic (S602). Here, the network traffic determination unit (120) converts the recombined network traffic data (or selected data) into one or more input sequences according to a predetermined sequence length or setting, and determines whether it is similar to the sequence pattern of the network traffic data used as learning data during training, thereby determining whether it is a known type or not.

If the network traffic data is determined to be a known type of network traffic data as determined in step S602, the label generation unit (130) classifies the network traffic data to determine a label for the network traffic data (S603).

If the network traffic data is not determined to be a known type of network traffic data as determined in step S602, the data and model storage unit (140) stores the input sequence (i.e., the input sequence converted from the recombined network traffic data) (S604).

The network traffic determination unit (120), label generation unit (130), determination model learning unit (151), and classification model learning unit (152) can request a subscription for a relearned model to the data and model storage unit (140) (i.e., including requirements and subscription conditions) (S605, S606, S607, S608). Here, the requirement(s) for the relearned model can include a model's identifier, a version, a generation time, an algorithm, an inference function, a performance, a reputation, etc., and the subscription condition(s) can include a subscription period, a subscription cycle, etc.

The data and model storage unit (140) reviews a first relearning condition (e.g., feedback on the result of traffic determination inference generated by the learning model, the period of use of the learning model, a relearning request event by an external system including a user, etc.) (S609). If the first relearning condition is satisfied, the data and model storage unit (140) requests the determination model learning unit (151) to relearn the traffic determination model (S610). Here, the data and model storage unit (140) can transmit relearning parameters such as a location of the training data set to be used for relearning, a storage location of the relearned model, and a setting value, etc., while requesting relearning.

When the determination model learning unit (151) receives a relearning request, it relearns the traffic determination model (S611) and transmits the relearned traffic determination model to the data and model storage unit (140) (S612).

If the subscription condition is satisfied, the data and model storage unit (140) transfers the relearned traffic determination model (i.e., subscription model) to the network traffic determination unit (120) (S613).

The network traffic determination unit (120) updates the existing traffic judgment model with the received relearned traffic determination model (S614).

In addition, the data and model storage unit (140) reviews a second relearning condition (e.g., feedback on an accuracy of a label generated by the learning model, a learning model usage period, a relearning request event by an external system including a user, etc.) (S615). If the second relearning condition is satisfied, the data and model storage unit (140) requests the classification model learning unit (152) to relearn the traffic classification model (S616). Here, the data and model storage unit (140) may transmit relearning parameters such as a location of the training data set to be used for relearning, a storage location of the relearned model, and a setting value, along with the relearning request.

When the classification model learning unit (152) receives the relearning request, relearns the traffic classification model (S617) and transmits the relearned traffic classification model to the data and model storage unit (140) (S618).

If the subscription condition is satisfied, the data and model storage unit (140) transfers the relearned traffic classification model (i.e., subscription model) to the label generation unit (130) (S619).

The label generation unit (130) updates the existing traffic classification model with the received relearned traffic classification model (S620).

In addition, the data and model storage unit (140) reviews a third re-learning condition (e.g., feedback on a result of traffic determination inference generated by the learning model, feedback on an accuracy of a label generated by the learning model, a learning model usage period, a re-learning request event by an external system including a user, etc.) (S621). If the third re-learning condition is satisfied, the data and model storage unit (140) requests the pre-training model learning unit (153) to re-learn the traffic classification model (S622). Here, the data and model storage unit (140) may transmit re-learning parameters such as a location of the training data set to be used for re-learning, a storage location of the re-learned model, and a setting value, while requesting re-learning.

When the pre-training model learning unit (153) receives a re-learning request, it re-learns the pre-training model (S623) and transfers the re-learned pre-training model to the data and model storage unit (140) (S624).

When the subscription condition(s) are satisfied, the data and model storage unit (140) transfers the re-learned pre-training model (i.e., subscription model) to the determination model learning unit (151) (S625). The determination model learning unit (151) updates the existing pre-training model with the received re-learned pre-training model (S626).

If the subscription condition(s) are satisfied, the data and model storage unit (140) transfers the re-learned pre-training model (i.e., subscription model) to the classification model learning unit (152) (S627). The classification model learning unit (152) updates the existing pre-training model with the received re-learned pre-training model (S628).

Figure 7:
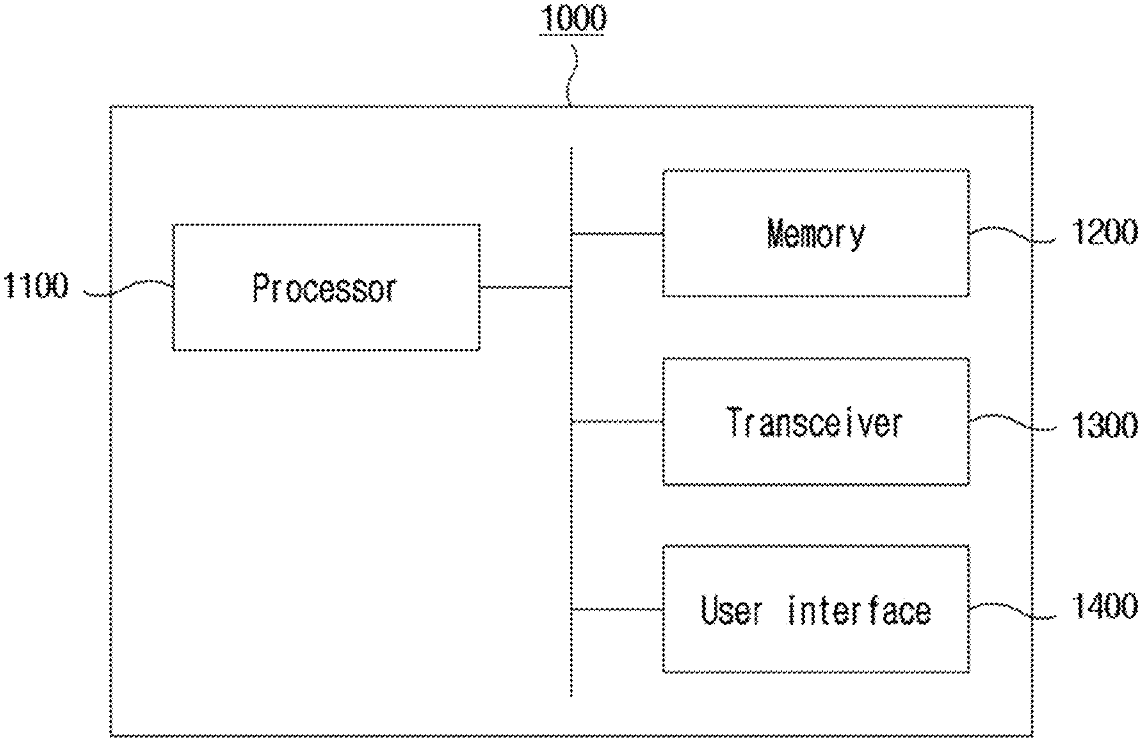
FIG. 7 is a block diagram of a network traffic labeling apparatus according to one embodiment of the present invention.

FIG. 7 is a block diagram of a network traffic labeling apparatus according to one embodiment of the present invention.

The apparatus according to FIG. 7 may correspond to the network traffic labeling apparatus according to FIG. 1. Alternatively, it may correspond to an apparatus that performs the operations of one or more of the functional units exemplified in FIG. 1 and/or FIG. 2. For example, if the apparatus is configured to perform the operations of one or more of the functional units among the preprocessing unit (110), the network traffic determination unit (120), the label generation unit (130), the data and model storage unit (140), and the artificial intelligence model learning unit (150), the example of FIG. 7 may be understood as a block diagram for each of the corresponding devices.

The apparatus (1000) may include one or more processors (1100), one or more memories (1200), one or more transceivers (1300), and one or more user interfaces (1400). The memory (1200) may be included in the processor (1100) or may be configured separately. The memory (1200) may store instructions that, when executed by the processor (1100), cause the apparatus (1000) to perform an operation. The transceiver (1300) may transmit and/or receive signals and data that the apparatus (1000) exchanges with other entities. The user interface (1400) may receive a user's input regarding the apparatus (1000) or provide an output of the apparatus (1000) to the user. Among the components of the apparatus (1000), components other than the processor (1100) and the memory (1200) may not be included in some cases, and other components not shown in FIG. 7 may be included in the apparatus (1000).

The processor (1100) may be configured to enable the above-described apparatus (1000) to perform methods according to various examples of the present disclosure. Although not shown in FIG. 7, the processor (1100) may be configured as a set of modules that perform each method/function proposed in this disclosure. Modules may be configured in hardware and/or software form.

Components described in exemplary embodiments of the present disclosure may be implemented by hardware elements. For example, the hardware element may include at least one of a digital signal processor (DSP), a processor, a controller, an application specific integrated circuit (ASIC), a programmable logic element such as an FPGA, a GPU, other electronic devices, or a combination thereof. At least some of the functions or processes described in the exemplary embodiments of the present disclosure may be implemented as software, and the software may be recorded on a recording medium. Components, functions, and processes described in exemplary embodiments may be implemented in a combination of hardware and software.

The method according to an embodiment of the present disclosure may be implemented as a program that can be executed by a computer, and the computer program may be recorded in various recording media such as magnetic storage media, optical read media, and digital storage media.

The various technologies described in this disclosure may be implemented as digital electronic circuits or computer hardware, firmware, software, or a combination thereof. The above technologies may be implemented as a computer program product, that is, a computer program tangibly embodied in an information medium (e.g., a machine-readable storage device (e.g., a computer-readable medium) or a data processing device) or a computer program implemented as signals processed by or propagated by a data processing device to cause the operation of the data processing device (e.g., programmable processor, computer, or multiple computers).

Computer program(s) may be written in any form of programming language, including compiled or interpreted languages and may be distributed as a stand-alone program or in any form, including modules, components, subroutines, or other units suitable for use in a computing environment. A computer program may be executed by a single computer or by multiple computers distributed at one site or multiple sites and interconnected by a communications network.

Examples of processors suitable for executing computer programs include general-purpose and special-purpose microprocessors, and one or more processors in digital computers. Typically, a processor receives instructions and data from read-only memory, random access memory, or both. Components of a computer may include at least one processor for executing instructions and one or more memory devices for storing instructions and data. Additionally, the computer may include one or more mass storage devices for data storage, such as magnetic, magneto-optical disks, or optical disks, or may be connected to the mass storage devices to receive and/or transmit data. Examples of information media suitable for implementing computer program instructions and data include optical media such as semiconductor memory devices (e.g., magnetic media such as hard disks, floppy disks, and magnetic tapes), compact disk read-only memory (CD-ROM), digital video disk (DVD), etc., magneto-optical media such as floptical disks, and read only memory (ROM), random access memory (RAM), flash memory, erasable programmable ROM (EPROM), electrically erasable programmable ROM (EEPROM), and other known computer-readable media. Processors and memories can be supplemented or integrated by special-purpose logic circuits.

A processor may run an operating system (OS) and one or more software applications that run on the OS. The processor device may also access, store, manipulate, process and generate data in response to software execution. For simplicity, the processor device is described in the singular, but those skilled in the art will understand that the processor device may include a plurality of processing elements and/or various types of processing elements. For example, a processor device may include a plurality of processors or a processor and a controller. Additionally, different processing structures, such as parallel processors, may be configured. Additionally, computer-readable media refers to all media that a computer can access, and may include both computer storage media and transmission media.

Although this disclosure includes detailed descriptions of various detailed implementation examples, the details should not be construed as limiting the invention or scope of the claims proposed in this disclosure, but rather illustrating features of specific exemplary embodiments.

Features individually described in exemplary embodiments in this disclosure may be implemented by a single exemplary embodiment. Conversely, various features described in this disclosure with respect to a single exemplary embodiment may be implemented by a combination or appropriate sub-combination of a plurality of exemplary embodiments. Furthermore, in the present disclosure, the features may operate by a specific combination, and the combination may initially be described as claimed, however, in some cases, one or more features may be excluded from the claimed combination, or claimed combinations may be modified in the form of sub-combinations or modifications of sub-combinations.

Similarly, even if operations are depicted in a specific order in the drawings, it should not be understood that execution of the operations in a specific order or sequence is necessary, or that performance of all operations is required to obtain a desired result. In certain cases, multitasking and parallel processing can be useful. Additionally, it should not be understood that the various device components in all exemplary embodiments are necessarily separate, and the above-described program components and devices may be packaged in a single software product or multiple software products.

The exemplary embodiments disclosed herein are illustrative only and are not intended to limit the scope of the disclosure. Those skilled in the art will recognize that various modifications may be made to the exemplary embodiments without departing from the scope of the claims and their equivalents.

Accordingly, this disclosure is intended to include all other substitutions, modifications and changes that fall within the scope of the following claims.

What is claimed is:

1. An apparatus for labeling network traffic data, the apparatus comprising at least one processor configured to implement:

a preprocessing unit for performing preprocessing on network traffic data;

a network traffic determination unit for determining whether the network traffic data is a known type of network traffic;

a label generation unit for classifying the network traffic data and determining a label for the network traffic data, when the network traffic data is the known type of network traffic;

a data and model storage unit for storing the network traffic data and requesting relearning for an artificial intelligence model based on a preconfigured condition, when the network traffic data is not the known type of network traffic; and an artificial intelligence model learning unit for performing relearning for the artificial intelligence model and updating an existing artificial intelligence model with the relearned artificial intelligence model, wherein the artificial intelligence model learning unit includes i) a determination model learning unit that learns a traffic determination model for determining the network traffic data, ii) a classification model learning unit that learns a traffic classification model for classifying the network traffic data, and iii) a pretraining model learning unit that learns a pretraining model that learns a basic model for the traffic determination model and the traffic classification model.

2. The apparatus of claim 1, wherein the preprocessing unit reassembles the network traffic data into a predetermined unit and then converts the network traffic data into an input sequence.

3. The apparatus of claim 2, wherein the network traffic determination unit determines whether the network traffic data is the known type of network traffic based on whether the converted input sequence is similar to an input sequence pattern used as learning data when training an artificial intelligence model for traffic classification.

4. The apparatus of claim 1, wherein the preconfigured condition includes a first relearning condition for the traffic determination model, a second relearning condition for the traffic classification model, and a third relearning condition for the pretraining model, and wherein the data and model storage unit individually requests the determination model learning unit, the classification model learning unit, and the pretraining model learning unit to relearn the traffic determination model, the traffic classification model, and the pretraining model, respectively, when the first relearning condition, the second relearning condition, and the third relearning condition are satisfied.

5. The apparatus of claim 4, wherein when the data and model storage unit receives a request for a relearned artificial intelligence model from the network traffic determination unit, the data and model storage unit responds the relearned traffic determination model, wherein when the data and model storage unit receives a request for a relearned artificial intelligence model from the label generation unit, the data and model storage unit responds the relearned traffic classification model, and wherein when the data and model storage unit receives a request for a relearned artificial intelligence model from the determination model learning unit or the classification model learning unit, the data and model storage unit responds the relearned pretraining model.

6. The apparatus of claim 4, wherein when a first subscription condition is satisfied, the data and model storage unit transmits the relearned traffic determination model to the network traffic determination unit, wherein when a second subscription condition is satisfied, the data and model storage unit transmits the relearned traffic classification model to the label generation unit, and wherein when a third subscription condition is satisfied, the data and model storage unit transmits the relearned pretraining model to the determination model learning unit or the classification model learning unit.

7. The apparatus of claim 6, wherein the first subscription condition, the second subscription condition, and the third subscription condition include at least one of a subscription period and a subscription cycle.

8. The apparatus of claim 1, wherein the preconfigured condition includes at least one of feedback on a result by the artificial intelligence model, a learning model usage period, and a relearning request event by an external system including a user.

9. A method for labeling network traffic data, the method comprising:

performing preprocessing on network traffic data;

determining whether the network traffic data is a known type of network traffic;

classifying the network traffic data and determining a label for the network traffic data, when the network traffic data is the known type of network traffic;

storing the network traffic data and performing relearning for an artificial intelligence model based on a preconfigured condition, when the network traffic data is not the known type of network traffic; and updating an existing artificial intelligence model with the relearned artificial intelligence model, wherein the artificial intelligence model includes i) a traffic determination model for determining the network traffic data, ii) a traffic classification model for classifying the network traffic data, and iii) a pretraining model corresponding to a basic model for the traffic determination model and the traffic classification model, wherein the preconfigured condition includes a first relearning condition for the traffic determination model, a second relearning condition for the traffic classification model, and a third relearning condition for the pretraining model, and wherein relearning of the traffic determination model, the traffic classification model, and the pretraining model is performed individually when the first relearning condition, the second relearning condition, and the third relearning condition are satisfied.

10. The method of claim 9, wherein the network traffic data is reassembled into predetermined units through the preprocessing and then converted into an input sequence.

11. The method of claim 10, wherein whether the network traffic data is the known type of network traffic is determined based on whether the converted input sequence is similar to an input sequence pattern used as learning data when training an artificial intelligence model for traffic classification.

12. The method of claim 9, wherein the preconfigured condition includes at least one of feedback on a result by the artificial intelligence model, a learning model usage period, and a relearning request event by an external system including a user.

13. The method of claim 9, wherein the existing artificial intelligence model is updated with the relearned artificial intelligence model when necessary of when a subscription condition is satisfied.

14. The method of claim 13, wherein the subscription condition includes at least one of a subscription period and a subscription cycle.

15. At least one non-transitory computer-readable medium storing at least one instruction, wherein the at least one instruction executable by at least one processor controls an apparatus to:

perform preprocessing on network traffic data;

determine whether the network traffic data is a known type of network traffic;

classify the network traffic data and determine a label for the network traffic data, when the network traffic data is the known type of network traffic;

store the network traffic data and perform relearning for an artificial intelligence model based on a preconfigured condition, when the network traffic data is not the known type of network traffic; and update an existing artificial intelligence model with the relearned artificial intelligence model, wherein the artificial intelligence model includes i) a traffic determination model for determining the network traffic data, ii) a traffic classification model for classifying the network traffic data, and iii) a pretraining model corresponding to a basic model for the traffic determination model and the traffic classification model, wherein the preconfigured condition includes a first relearning condition for the traffic determination model, a second relearning condition for the traffic classification model, and a third relearning condition for the pretraining model, and wherein relearning of the traffic determination model, the traffic classification model, and the pretraining model is performed individually when the first relearning condition, the second relearning condition, and the third relearning condition are satisfied.

* * * * *